US008559346B2

(12) United States Patent
Hole

(10) Patent No.: US 8,559,346 B2
(45) Date of Patent: Oct. 15, 2013

(54) SYSTEM AND METHOD FOR CONTROLLING EXTENDED UPLINK TEMPORARY BLOCK FLOW AND DYNAMIC TIMESLOT REDUCTION

(75) Inventor: David Philip Hole, Southampton (GB)

(73) Assignee: BlackBerry Limited, Waterloo, Ontario (CA)

( * ) Notice: Subject to any disclaimer, the term of this patent is extended or adjusted under 35 U.S.C. 154(b) by 449 days.

(21) Appl. No.: 12/950,279

(22) Filed: Nov. 19, 2010

(65) Prior Publication Data

US 2012/0127901 A1 May 24, 2012

(51) Int. Cl.
*G08C 17/00* (2006.01)
(52) U.S. Cl.
USPC .......................................... 370/311; 455/450
(58) Field of Classification Search
None
See application file for complete search history.

(56) References Cited

U.S. PATENT DOCUMENTS

2010/0210275 A1* 8/2010 Navratil et al. ............... 455/450
2011/0007697 A1* 1/2011 Ryu et al. ...................... 370/329

OTHER PUBLICATIONS

3GPP TSG GERAN#42 Tdoc GP-090825 "Dynamic Timeslot Reduction", May 2009.*

* cited by examiner

*Primary Examiner* — Kibrom T Hailu
(74) *Attorney, Agent, or Firm* — Quarles & Brady LLP

(57) ABSTRACT

A system and method for data transmission protocols in mobile communication systems and, more specifically, for controlling mobile stations (MSs) configured to implement extended uplink temporary block flows (EXT_TBF) is presented. An indication that EXT_UTBF_NODATA is not enabled is received at a mobile station. The mobile station enters a power saving mode and receives a first resource allocation via an uplink state flag (USF) in accordance with a resource assignment. While in the power saving mode and when the mobile station has no radio link control (RLC) media access control (MAC) blocks ready to transmit, the mobile station operates in an EXT_UTBF_NODATA mode by not transmitting a dummy block to a network.

25 Claims, 6 Drawing Sheets

SYSTEM AND METHOD FOR CONTROLLING EXTENDED UPLINK TEMPORARY BLOCK FLOW AND DYNAMIC TIMESLOT REDUCTION

BACKGROUND

The present disclosure relates generally to data transmission protocols in mobile communication systems and, more specifically, to systems and methods for controlling mobile stations (MSs) configured to implement extended uplink temporary block flows (EXT_TBF) and dynamic timeslot reduction (DTR).

As used herein, the terms MS, "user agent," and "user equipment" (UE) can refer to electronic devices such as mobile telephones, personal digital assistants (PDAs), hand-held or laptop computers, and similar devices that have network communications capabilities. In some configurations, MS may refer to a mobile, wireless device. The terms may also refer to devices that have similar capabilities but that are not readily transportable, such as desktop computers, set-top boxes, or network nodes.

An MS may operate in a wireless communication network that provides for data communications. For example, the MS may operate in accordance with Global System for Mobile Communications (GSM) and General Packet Radio Service (GPRS) technologies. Today, such an MS may further operate in accordance with Enhanced Data rates for GSM Evolution (EDGE), Enhanced GPRS (EGPRS), Enhanced GPRS Phase 2 (EGPRS2), or GSM EDGE Radio Access Network (GE-RAN).

To communicate with a network, an MS is configured to use a medium access control (MAC) protocol to determine the uplink (UL) and/or downlink (DL) communication resources available for use by the MS. GPRS, for example, uses a timeslot structure similar to that of GSM, but where timeslots can be dynamically allocated to MSs for both uplink and downlink transmissions. To communicate with a GPRS network, therefore, an MS may be configured to have a multi-slot capability that enables the MS to use between one (1) and eight (8) timeslots per carrier for data transfer between the MS and network. Because uplink and downlink channels are reserved separately, various multi-slot resource configurations may be assigned in different directions in different communications networks.

An MS may be allocated timeslots on dual carriers. A dual carrier 'assignment' comprises a set of timeslots assigned on the two carriers. In the case of an uplink dual carrier assignment, the assignment includes the total set of timeslots on both carriers that may be used by the MS for uplink transmissions; in the case of a downlink dual carrier assignment, the assignment is the total set of timeslots on both carriers upon which the network may send data to the MS.

For any given radio block period, the network dynamically allocates resources and determines upon which downlink timeslots or uplink timeslots the MS may receive and/or transmit data. In basic transmission time intervals (BTTI), a given radio block period can include 4 time division multiple access (TDMA) frames with each TDMA frame including 8 timeslots. The allocation algorithm may be implementation dependent, but may take account of the MS's multislot class (the maximum number of timeslots on which the MS can transmit or receive, and the time required to switch from transmit to receive and vice versa), and may take account of the amount of data the network (e.g., a base station controller (BSC)) or other network component expects the MS to receive or transmit).

In some cases, reduced transmission time intervals (RTTI) are used to communication with an MS. RTTI are a modification to the above structure where, instead of a radio block being transmitted as four bursts with each block being sent in a particular timeslot over four TDMA frames, a radio block (containing essentially the same amount of information) is transmitted using two timeslots in two TDMA frames. This reduces the transmission time for a block and reduces the overall latency of the system. Accordingly, a "reduced radio block period" can be 2 TDMA frames (approximately 10 ms) compared with a basic radio block period, which can be 4 TDMA frames (approximately 20 ms).

In a network, uplink allocations can be signaled to an MS using an uplink state flag (USF), which is a number between 0 and 7 (inclusive) that is signaled in downlink radio blocks. As part of the MS's uplink assignment, the MS is informed of which USF(s) on which timeslot(s) indicate an uplink allocation for that MS. USFs are generally included in the headers of downlink blocks. In the case of RTTI, USFs may be coded across radio blocks across four TDMA frames, for example, in the same manner as downlink BTTI radio blocks are sent (e.g., "BTTI USF mode") or (using two timeslots) across two TDMA frames (e.g., "RTTI USF mode").

In some communication standards, there are "m" timeslots assigned for reception and "n" timeslots assigned for transmission. Thus, for a multislot class type 1 MS, there may be Min(m,n,2) reception and transmission timeslots with the same timeslot number. For a multislot class type 2 MS, there may be Min(m,n) reception and transmission timeslots with the same timeslot number. In the case of downlink dual carrier configurations, if timeslots with the same timeslot number are assigned on both channels, in calculating the value of m they may be counted as one timeslot. As a result, where both downlink and uplink timeslots are assigned, if assigned a single timeslot in one direction and one or more timeslots in the opposite direction, the timeslot number of the first timeslot may be the same as one of the timeslot(s) in the opposite direction. Similarly, if assigned two or more uplink timeslots and two or more downlink timeslots, at least two of the uplink and downlink timeslots may have a common timeslot number. As a result, in uplink+downlink assignments, the timeslots that may be monitored for USFs and downlink data blocks may be largely co-incident. In some networks, assignments and allocations are essentially under the control of the network (for example, the BSC).

During an ongoing packet data session, for example, an MS with an assigned downlink TBF (temporary block flow) can be required to monitor all downlink timeslots in the MS's assignment in case the network sends the MS data in any of the allocated downlink timeslots. Similarly, if an MS has an assigned uplink TBF, the MS may be required to monitor all timeslots on which the USF (uplink state flag) could be sent to dynamically allocate uplink resources. If an MS has both uplink and downlink TBFs, therefore, the MS must monitor as many relevant downlink timeslots as possible, taking into account any allocated uplink transmissions opportunities.

In the case that either the network or the MS has no data to send (or only a small amount of data to send), and particularly when neither the network nor the MS has data to transmit, this monitoring activity results in significant wasted battery power in the MS. To minimize battery power consumption, the assigned resources (e.g., TBFs) may be maintained, while the number of timeslots that the MS monitors is reduced. This reduction in the number of timeslots being monitored can be referred to as DTR.

When operating in DTR mode an MS (for example an MS operating in packet transfer mode (i.e. with assigned packet resources)) can reduce its battery consumption by reducing the set of timeslots that the MS monitors for downlink data and/or uplink allocations (as indicated by uplink state flags (USFs)). The MS may monitor only a single timeslot or, in RTTI, a single pair of timeslots per radio block period. As a result, the network may only transmit new data or USFs on timeslots that are actually monitored by the MS. Generally, for an MS in DTR mode, the transmission or reception of any new data causes the MS to leave DTR mode. Depending upon the system implementation, other events may also cause the MS to leave DTR mode.

Although many mechanisms may be defined to cause an MS to enter DTR mode, in some network configurations two mechanisms are defined: option 1—by transmitting a PACKET UPLINK ACK/NACK (PUAN) control message containing DTR information to the MS, or option 2—by means of DTR information included within a Radio Link Control (RLC) data block transmitted to the MS.

In option 1, when a PUAN is used to instruct the MS to enter DTR, one of the conditions that should be met before the MS enters DTR is that no data block has been transmitted or received in the previous (max(BS_CV_MAX, 1)−1) block periods, where BS_CV_MAX has a pre-determined value. Generally, the condition that no data block has been transmitted or received in the previous (max(BS_CV_MAX, 1)−1) block periods must be met at the time when the PUAN is received; if not, the DTR Information in the PUAN is ignored and the MS will not enter DTR.

In the second option, when using DTR information included within an RLC data block to cause the MS to enter DTR, the conditions for the MS entering DTR are 1) that any received poll has been responded to, 2) that V(R)=V(Q), and 3) that the block with sequence number V(R)−1 contain DTR information.

In this option, the parameters V(R), V(Q), V(N) relate to the RLC receive window in the MS that is associated with RLC data blocks. V(N) refers to an array of elements, each of which can take the value INVALID or RECEIVED. V(R) identifies the block sequence number (BSN) of the next expected block (i.e. one more than the highest BSN that has been seen or, in some cases, one higher than the highest BSN whose corresponding data block has been received correctly). V(Q) refers to the lowest BSN identifying a block that has not yet been received correctly.

When using DTR information included within a RLC data block to cause the MS to enter DTR, it may not be necessary that all three conditions be satisfied in any particular order. For example, an MS may first receive blocks 1, 2, 3, and 4, then receive block 7 containing DTR information, and then later receive blocks 5 and 6 (e.g. in response to a request for retransmission). At that end of that sequence, even though all blocks were not received in order and all conditions were not satisfied in order, the MS will enter DTR because V(Q)=V(R)=8, and the block with BSN=V(R)−1 (i.e. 7) contained DTR information (presuming the MS has responded to any pending polls).

When using DTR information included within a RLC data block to cause the MS to enter DTR, Table 1 illustrates an example EGPRS downlink RLC data block for instructing an MS to enter DTR.

TABLE 1

| | | | | | Bit | | | |
|---|---|---|---|---|---|---|---|---|
| | | | | | 2 | 1 | | |
| | | | | | FBI | E | | |
| | | | | Bit | | | | |
| 8 | 7 | 6 | 5 | 4 | 3 | 2 | 1 | |
| Length indicator | | | | | | | E | Octet 1 (note) (optional) |
| | | | | . | | | | . |
| | | | | . | | | | . |
| | | | | . | | | | . |
| Length indicator | | | | | | | E | Octet M (optional) |
| | | | | | | | | Octect M + 1 |
| | | | RLC data | | | | | . |
| | | | | | | | | . |
| | | | | | | | | Octet K − 1 |
| spare | | DTR Blks | | CI | TN/PDCH-pair | | | Octet K (optional) |
| | | | | | | | | . |
| | | | | | | | | . |
| | | | | | | | | . |
| | | | | | | | | Octet N2 − 1 |
| | | | | | | | | Octet N2 |

Referring to Table 1, the carrier ID (CI) field contains an identification of the carrier that may be encoded as DTR_CI IE. The CI field can be used to indicate the carrier that the MS monitors when DTR is used. In that case, the timeslot or PDCH-pair to monitor on that carrier can be indicated with the TN/PDCH-pair field. The TN/PDCH-pair field may contain the timeslot number (BTTI configuration) or the PDCH-pair number (RTTI configuration) the MS monitors on the indicated carrier (CI field) when DTR is implemented. Finally, the DTR Blks field may indicate a subset of downlink radio blocks during which the MS monitors for USFs and/or downlink RLC data blocks when in DTR mode.

In controlling an MSs DTR state, various DTR parameters can be used to indicate which timeslot (or timeslot pair, in the case of RTTI where radio blocks are sent using two timeslots) the MS monitors when in DTR mode. The network may also indicate that the MS is to monitor these timeslots only in certain radio block periods i.e. in not all radio block periods, thus permitting the MS to save considerably more battery power.

Extended Uplink TBF (EXT_UTBF) mode allows an uplink TBF established between an MS and an associated network component to persist even when the MS has no data to transmit. Without extending the TBF, the TBF would ordinarily terminate upon successful transmission of all pending data by the MS. After terminating the TBF, if the MS subsequently needs to transmit new data, the MS and network must renegotiate the creation of a new TBF. As such, by extending the lifetime of uplink TBFs, should the MS need to transmit new data a short time after having completed a previous data transmission, the new data can be transmitted quickly using the existing TBF without the delay associated with creating a new uplink TBF.

In some cases, when in EXT_UTBF mode, the MS is required to transmit dummy data blocks (e.g., PACKET UPLINK DUMMY CONTROL BLOCKS) in response to receiving a USF indicating that the MS is allocated resources for uplink data transmission to ensure that the TBF being extended does not terminate prematurely. To prevent the unnecessary battery consumption and interference associated with transmitting dummy blocks, however, an EXT_UTBF_NODATA flag has been defined to indicate whether, with a TBF operating in EXT_UTBF mode, the MS is required to transmit the dummy blocks even if the MS has no other information to send. Generally, the network will maintain a TBF for no longer than 5 seconds after the last data has been transferred, but this limit may be extended if EXT_UTBF_NODATA is set (e.g., to a value of '1').

The EXT_UTBF_NODATA flag is a 1 bit field that, when enabled, indicates the MS, during extended uplink TBF mode, may refrain from sending PACKET UPLINK DUMMY CONTROL BLOCK messages when there are no other RLC/MAC blocks ready to send in an uplink radio block allocated by the network. When refraining from sending the dummy blocks (or optionally sending dummy blocks even though not required), the MS is considered to be operating in EXT_UTBF_NODATA mode. If the flag is not enabled (e.g., has a value of 0 or is omitted e.g. because the IE in which it is transmitted is truncated or is not broadcast or otherwise transmitted at all), to maintain the uplink TBF, the MS is required to transmit a PACKET UPLINK DUMMY CONTROL BLOCK message in an uplink radio block allocated by the network when there is no other RLC/MAC block ready to send. But if the flag is enabled (e.g., has a value of 1), the MS may refrain from sending PACKET UPLINK DUMMY CONTROL BLOCK messages when there is no other RLC/MAC block ready to send in an uplink radio block allocated by the network and the uplink TBF will be maintained. Correspondingly, when an MS is operating in EXT_UTBF_NODATA mode, the network may operate in what may be considered a corresponding EXT_UTBF_NODATA mode, wherein the network may omit to increment a counter (such as counter N3101) when no RLC/MAC block is received using a radio block allocated to the MS, and hence, (or in any case,) may maintain the assigned TBF resources (i.e. may continue to consider the TBF assignment to the MS as valid) regardless of the number of radio blocks allocated to the MS for which no RLC/MAC block is received.

Generally, existing network implementations require that the broadcast indicator EXT_UTBF_NODATA be set to '1' before DTR can be utilized by DTR-capable MSs. Based upon this restriction, existing network specifications limit the possible modes of operation for an MS capable of operating in EXT_UTBF_NODATA and DTR modes to the options shown in Table 2. When the EXT_UTBF_NODATA flag is not set (e.g., has a value of '0'), DTR is not allowed and no MSs will implement EXT_UTBF_NODATA mode. If, however, the EXT_UTBF_NODATA flag is set (e.g., has a value of '1'), DTR is allowed and EXT_UTBF_NODATA mode will be used by MSs (including those which do not support DTR). In other words, unless EXT_UTBF_NODATA is set, no MS are allowed to use DTR mode.

In accordance with this system implementation, therefore, the network is forced to broadcast EXT_UTBF_NODATA=1 in order to allow any MS in the cell to use DTR. This may not be desirable if, for example, general network preferences are to limit the use of EXT_UTBF_NODATA=1 to DTR mode and/or to DTR-capable mobiles.

Other candidate implementations do not require any particular value of the EXT_UTBF_NODATA flag for a mobile to enter DTR. Implicitly, these implementations cause the MS's behavior while in DTR mode to follow the broadcast indication. In such an implementation, therefore, the possible states for MS operation are shown in Table 3.

TABLE 3

| Broadcast EXT_UTBF_NODATA value | Non-DTR-capable MS behaviour | DTR-capable MS behavior (during non-DTR mode) | DTR allowed? | EXT_UTBF_NODATA behavior during DTR mode |
|---|---|---|---|---|
| 0 | 0 | 0 | Yes | 0 |
| 1 | 1 | 1 | Yes | 1 |

This implementation, however, does not allow an MS to operate in EXT_UTBF_NODATA mode while the MS is operating in DTR mode if the EXT_UTBF_NODATA flag has a value of '0'. This results in the contradictory requirement that if an MS is in DTR mode to save battery power, the MS is simultaneously required to transmit dummy control blocks, wasting power.

Therefore, in existing network implementations, the network has no flexibility over EXT_UTBF_NODATA behavior if the network also wishes for MSs capable of DTR to operate in DTR mode.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

TABLE 2

| Broadcast EXT_UTBF_NODATA value | Non-DTR-capable MS behaviour | DTR-capable MS behavior (during non-DTR mode) | DTR allowed? | EXT_UTBF_NODATA behavior during DTR mode |
|---|---|---|---|---|
| 0 | 0 | 0 | No | not applicable |
| 1 | 1 | 1 | Yes | 1 |

Figure 6:
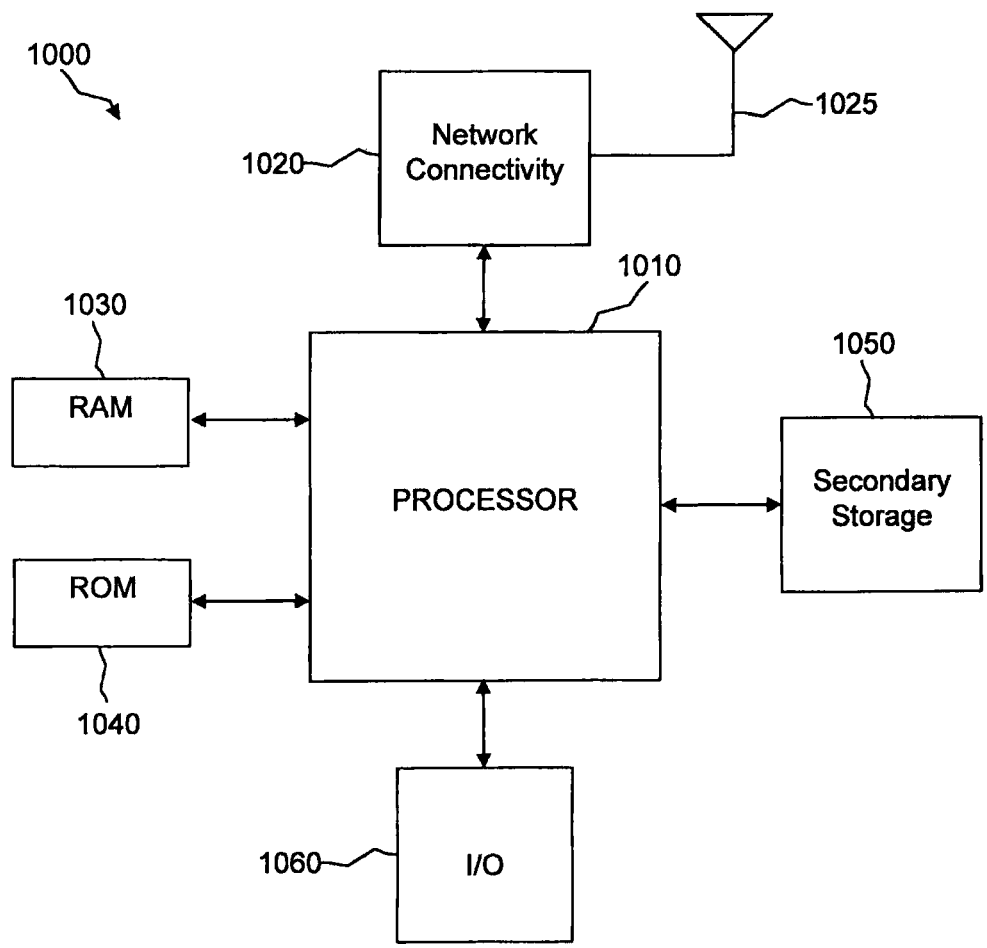

FIG. 6 is an illustrative general purpose computer system suitable for some of the various embodiments of the disclosure.

DETAILED DESCRIPTION

The present disclosure relates generally to data transmission protocols in mobile communication systems and, more specifically, to systems and methods for controlling mobile stations (MSs) configured to implement extended uplink temporary block flows (EXT_TBF) and dynamic timeslot reduction (DTR).

The method may include receiving, at a mobile station, an indication that EXT_UTBF_NODATA is not enabled, entering a power saving mode, and receiving a first resource allocation via an uplink state flag (USF) in accordance with a resource assignment. While in the power saving mode and when the mobile station has no radio link control (RLC) media access control (MAC) blocks ready to transmit, the method includes operating in an EXT_UTBF_NODATA mode by not transmitting a dummy block to a network.

Other implementations include a method comprising receiving, at a mobile station, an indication that EXT_UTBF_NODATA is enabled, entering a power saving mode, and receiving a first resource allocation via an uplink state flag (USF) in accordance with a resource assignment. The method includes operating in a non-EXT_UTBF_NODATA mode by transmitting dummy blocks to a network using the first allocated resource.

Other implementations include a method comprising transmitting, to a mobile station, an indication that EXT_UTBF_NODATA is not enabled, determining that the mobile station has entered a power saving mode, and transmitting a first resource allocation to the mobile station via an uplink state flag (USF) in accordance with a resource assignment. When at least one of a dummy block configured to maintain the first allocated resource and a radio link control (RLC) media access control (MAC) block are not received from the mobile station in response to the first resource allocation, the method includes maintaining the first allocated resource.

Other implementations include a mobile station comprising a processor in communication with a memory storing instructions executable by the processor. The instructions cause the processor to receive an indication that EXT_UTBF_NODATA is not enabled, enter a power saving mode, and receive a first resource allocation via an uplink state flag (USF) in accordance with a resource assignment. The instructions cause the processor to, while in the power saving mode and when the mobile station has no radio link control (RLC) media access control (MAC) blocks ready to transmit, operate in an EXT_UTBF_NODATA mode.

Other implementations include a network component comprising a processor in communication with a memory storing instructions executable by the processor. The instructions cause the processor to transmit, to a mobile station, an indication that EXT_UTBF_NODATA is not enabled, determine that the mobile station has entered a power saving mode, and transmit a first resource allocation to the mobile station via an uplink state flag (USF) in accordance with a resource assignment. The instructions cause the processor to, when at least one of a dummy block configured to maintain the first allocated resource and a radio link control (RLC) media access control (MAC) block are not received from the mobile station in response to the first resource allocation, maintain the first allocated resource.

Other implementations include a computer readable storage medium storing program instructions which, when executed by a processor in a mobile station, cause the processor to receive an indication that EXT_UTBF_NODATA is not enabled, enter a power saving mode, and receive a first resource allocation via an uplink state flag (USF) in accordance with a resource assignment. The instructions cause the processor to, while in the power saving mode and when the mobile station has no radio link control (RLC) media access control (MAC) blocks ready to transmit, operate in an EXT_UTBF_NODATA mode.

The various aspects of the disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the scope of the claimed subject matter.

As used herein, the terms "component," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, channel, or media. For example, computer readable media can include but are not limited to magnetic storage devices (for example, hard disk, floppy disk, magnetic strips, and the like), optical disks (for example, compact disk (CD), digital versatile disk (DVD), and the like), smart cards, and flash memory devices (for example, card, stick, and the like). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the claimed subject matter.

The present system and method provides a network with additional flexibility in controlling an MS's behavior with regards to EXT_UTBF_NODATA mode in conjunction with DTR mode. The MS may enter DTR mode, for example, by means of the network instructing an MS to enter DTR mode (or the MSs may enter DTR mode unilaterally, without instruction from the network), without requiring the network to also broadcast an enabled EXT_UTBF_NODATA flag (e.g., having a value of '1'). Generally, in accordance with the present system, an MS's behavior during DTR mode can be defined to operate in accordance with an EXT_UTBF_NO-DATA flag having a value of '1' or '0', either explicitly under network control, by means of new signaling, independent of any signaling (for example, when the MS is pre-configured), or specified as a function of existing signaling. The MS behavior may be independent of behavior during non-DTR mode and/or independent of behavior applicable to non-DTR capable mobiles.

The present system may also allow for point-to-point (i.e. device-specific) explicit indications of the EXT_UTBF_NO-DATA flag value (for operation of DTR-capable MSs in DTR and/or non-DTR mode). A point-to-point explicit indication may provide device-specific indication of the EXT_UTBF_NODATA flag value for non-DTR capable MSs.

Also, in accordance with the present system, MS behavior during non-DTR mode may be a function of whether the MS has previously operated in DTR mode within the cell. This allows, for example, a network to broadcast an EXT_UTBF_NODATA flag having a value of '0' (or to omit broadcasting the flag at all), but allow DTR-capable MSs to behave as if the EXT_UTBF_NODATA flag has a value of '1' by putting an MS into DTR mode first. This may be useful if, for example, the EXT_UTBF_NODATA flag is generally set to 0 in networks due to interoperability issues with some legacy MSs. In that case, inter-operability testing for DTR-capable mobiles could ensure that EXT_UTBF_NODATA behavior is correct.

As such, the present system provides for increased flexibility with regards to the setting of the EXT_UTBF_NODATA flag and associated MS behavior. Using the system, when the network broadcasts the EXT_UTBF_NODATA flag with a non-enabled value (e.g., '0'), an MS may, nonetheless, be permitted to enter DTR and, during DTR, to behave as if EXT_UTBF_NODATA had an enabled value (e.g., '1'). Although the present system is described in terms of EXT_UTBF_NODATA and DTR mode operation, it is to be noted that rather than relate specifically to DTR mode, the present system may be operated in conjunction with a network where MSs, rather than enter DTR mode, are configured to enter into some other mode of operation, or activate some other feature, in particular a mode intended (primarily or otherwise) to reduce MS power consumption.

Throughout the present disclosure, the term EXT_UTBF_NODATA mode or behavior refers to whether the MS behaves as if EXT_UTBF_NODATA is set or enabled. If not enabled, the MS responds to every USF and the MS does not refrain from transmitting on allocated uplink timeslots. The MS also sends PACKET UPLINK DUMMY CONTROL BLOCKs when there are no other RLC/MAC blocks ready to send. If, however, EXT_UTBF_NODATA is enabled, the MS operates in EXT_UTBF_NODATA mode and may optionally refrain, at least some of the time, from sending a PACKET UPLINK DUMMY CONTROL BLOCK message in response to a resource allocation received via a USF when there are no other RLC/MAC blocks ready to send in an uplink radio block allocated by the network.

In one implementation of the present system, the MS is configured to enter DTR (such as would normally require an enabled EXT_UTBF_NODATA flag), even when the broadcast value of the EXT_UTBF_NODATA flag is not enabled (e.g., '0'). The MS may enter DTR in accordance with an instruction from the network, or may do so unilaterally where entering DTR mode is initiated by the MS itself (e.g., in accordance with a pre-determined algorithm). Accordingly, the MS behavior is modified to operate in accordance with the state table of Table 4.

TABLE 4

| Broadcast EXT_UTBF_NODATA value | Legacy (non-DTR capable) MS behaviour | DTR-capable MS behavior (during non-DTR mode) | DTR allowed? | EXT_UTBF_NODATA behavior during DTR mode |
|---|---|---|---|---|
| 0 | 0 | 0 | Yes | 1 |
| 1 | 1 | 1 | Yes | 1 |

As shown in Table 4, irrespective of the value of the EXT_UTBF_NODATA flag, an MS in DTR mode (and, therefore, capable of operating in DTR mode) is configured to also operate in EXT_UTBF_NODATA mode. As such, the MS can monitor a reduced number of resources, while also refraining from transmitting dummy packets in order to maintain an extended TBF. In one implementation, the MS is configured to refrain from transmitting dummy blocks in response to the most recently received resource allocation made via a USF (i.e., with no intervening resource allocations). If, after refraining from a first resource allocation, the MS identifies data ready to transmit and then, subsequently, receives another resource allocation, the MS will use that second resource allocation to the transmit the data. Simultaneously, by broadcasting the EXT_UTBF_NODATA flag with a value of '0', the network can force non-DTR capable and DTR-capable, but not operating in DTR mode, MSs to broadcast dummy control packets during TBFs operating in extended uplink TBF mode. Because this implementation is primarily driven by modifications to the operations of the MS, the implementation does not require any additional signaling to effect the desired operation.

In this implementation, while operating in DTR mode, the MS may be configured to consider EXT_UTBF_NODATA as enabled (set to '1') independent of the actual value signaled in, for example, the GPRS Cell Options IE (i.e., the MS may refrain from sending PACKET UPLINK DUMMY CONTROL BLOCK messages when there is no other RLC/MAC block ready to send). As such, when an MS operates in DTR mode the MS does not need to inspect the value of the EXT_UTBF_NODATA flag—the MS just operates in EXT_UTBF_NODATA mode automatically. Thus, in one specific implementation, an MS operating in extended uplink TBF mode may refrain from sending PACKET UPLINK DUMMY CONTROL BLOCK messages when there are no other RLC/MAC blocks ready to send only if i) so indicated by the EXT_UTBF_NODATA parameter or ii) the MS is operating in DTR mode.

Alternatively, if MSs are allowed to enter DTR mode (for example, due to network instruction or unilaterally) even when the broadcast value of the EXT_UTBF_NODATA flag is '0', DTR-enabled MSs may be configured to operate either in or out of EXT_UTBF_NODATA mode regardless of whether or not they are in DTR mode. The setting may be selected for a particular MS, class of MSs, or all DTR-enabled MSs connected to the network. In that case, an MS may be configured to operate in accordance with the state table shown in Table 5, with the 'to be specified' value being selected in accordance with system and/or network requirements, and possibly being pre-defined for one or more MS.

As shown in Table 6, the flag EXT_UTBF_NODATA_DTR can have a value of 0 or 1. When the EXT_UTBF_NODATA flag is not enabled (e.g., having a value of '0'), either of the candidate values (e.g., '0' or '1') for the EXT_UTBF_NODATA_DTR flag can be defined to have any desired affect on the EXT_UTBF_NODATA behavior of a DTR-capable MS when the MS is not in DTR mode. When the MS is in DTR mode (e.g. due to network instruction or by entering DTR mode unilaterally), though, when EXT_UTBF_NODATA_DTR has a value of '0' the MS will not undertake EXT_UTBF_NODATA behavior and, conversely, when EXT_UTBF_NODATA_TR has a value of '1' the MS will undertake EXT_UTBF_NODATA behavior.

When the EXT_UTBF_NODATA flag is enabled (e.g., having a value of '1'), though, the EXT_UTBF_NODATA_

TABLE 5

| Broadcast EXT_UTBF_NODATA value | Legacy (non-DTR capable) mobile behaviour | DTR-capable mobile behavior (during non-DTR mode) | DTR allowed? | EXT_UTBF_NODATA behavior during DTR mode |
|---|---|---|---|---|
| 0 | 0 | 0 or 1 (to be specified) | Yes | 0 or 1 (to be specified) |
| 1 | 1 | 1 | Yes | 1 |

Accordingly, with reference to Table 5, if the value of the broadcast EXT_UTBF_NODATA flag is set to 0, DTR-capable MSs may be pre-configured to operate in a particular manner when in DTR mode and a particular manner when not in DTR mode; these manners may be the same or different.

In another implementation, additional signaling is provided to indicate to DTR-capable MSs whether to implement EXT_UTBF_NODATA when operating in DTR mode. The additional signaling may be distributed in the form of a broadcast message and/or via point-to-point signaling. Table 6 illustrates the additional signaling (EXT_UTBF_NODATA_DTR) and how the value of the additional signaling (either '0' or '1') affects the behavior of DTR-capable MSs. Note that Table 6 only illustrates an example state table incorporating the new signaling—the state table may be modified depending upon the system implementation and various system requirements.

DTR flag will have a predetermined affect on MS behavior. For DTR capable MSs, when the EXT_UTBF_NODATA flag is set and the MS is not in DTR mode, the MS will always implement EXT_UTBF_NODATA mode, regardless of the EXT_UTBF_NODATA_DTR flag value. When the MS is in DTR mode, the MS will implement EXT_UTBF_NODATA only when the EXT_UTBF_NODATA_DTR flag is set.

In another implementation, a combination of three flags, EXT_UTBF_NODATA, EXT_UTBF_NODATA_DTR, and EXTUTBF_NODATA_NON_DTR are used to control MS behavior. By setting a particular value for each flag, the network can control the EXT_UTBF_NODATA behavior of a DTR-capable MS operating in either of DTR and non-DTR modes. Table 7 shows the different states of the MS, given each possible combination of the three input flags. Note that Table 7 only illustrates an example state table incorporating the new signaling—the state table may be modified depending upon the system implementation and various system requirements.

TABLE 6

| Broadcast EXT_UTBF_NODATA value | EXT_UTBF_NODATA_DTR (b/cast or point-to-point) | Legacy (non-DTR capable) MS behavior | DTR-capable MS behavior (during non-DTR mode) | DTR allowed? | EXT_UTBF_NODATA behavior during DTR mode |
|---|---|---|---|---|---|
| 0 | 0 | 0 | 0 or 1 (to be specified) | Yes | 0 |
| 0 | 1 | 0 | 0 or 1 (to be specified) | Yes | 1 |
| 1 | 0 | 1 | 1 | Yes | 0 |
| 1 | 1 | 1 | 1 | Yes | 1 |

TABLE 7

| Broadcast EXT_UTBF_NODATA value | EXT_UTBF_NODATA_DTR (b/cast or point-to-point) | EXT_UTBF_NODATA_non DTR (b/cast or point-to-point) | Legacy (non-DTR capable) MS behavior | DTR-capable MS behavior (during non-DTR mode) | DTR allowed? | EXT_UTBF_NODATA behavior during DTR mode |
|---|---|---|---|---|---|---|
| 0 | 0 | 0 | 0 | 0 | Yes | 0 |
| 0 | 0 | 1 | 0 | 1 | Yes | 0 |
| 0 | 1 | 0 | 0 | 0 | Yes | 1 |
| 0 | 1 | 1 | 0 | 1 | Yes | 1 |
| 1 | 0 | 0 | 1 | 0 | Yes | 0 |
| 1 | 0 | 1 | 1 | 1 | Yes | 0 |
| 1 | 1 | 0 | 1 | 0 | Yes | 1 |
| 1 | 1 | 1 | 1 | 1 | Yes | 1 |

Referring to Table 7, in some implementations, some combinations of the EXT_UTBF_NODATA, EXT_UTBF_NODATA_DTR and EXT_UTBF_NODATA_NON_DTR flags are unlikely to be utilized by the network. For example, the three rows having bolded and underlined values may not be used, and the network may be configured to avoid transmitting those particular combinations of flags.

Figure 1:
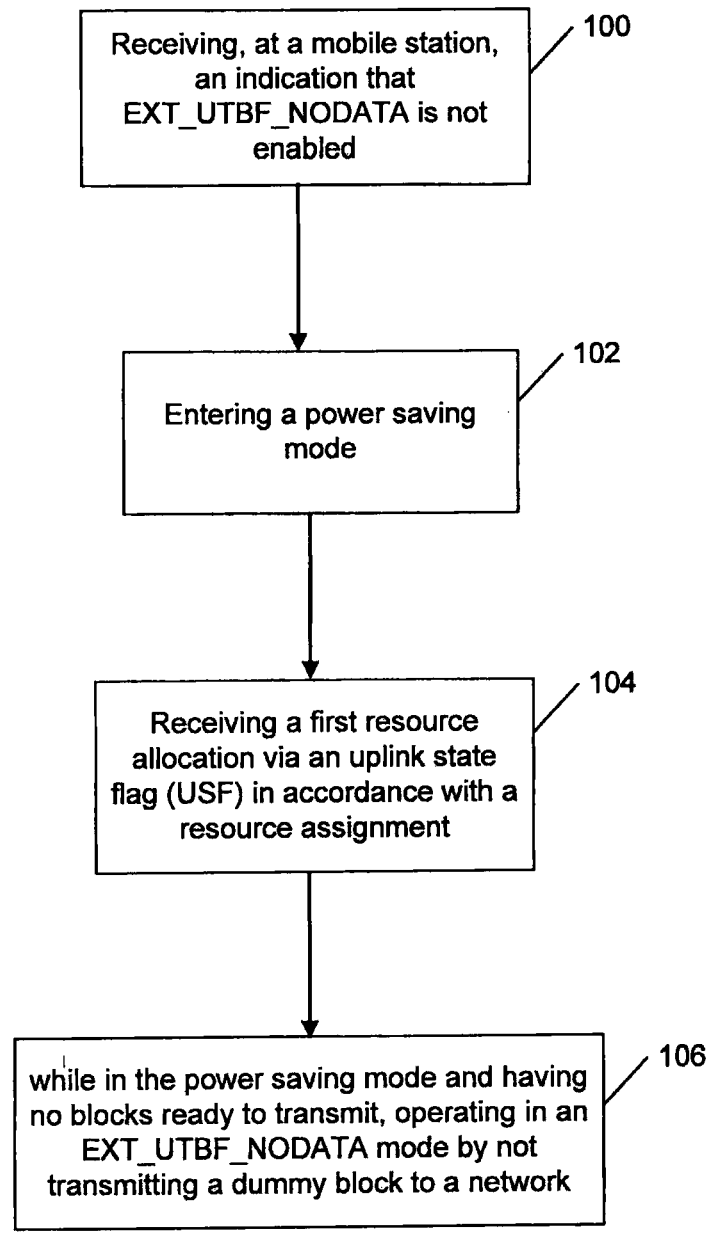
FIG. 1 is a flowchart illustrating a method executable by an MS to control the transmission of dummy blocks in EXT_UTBF_NODATA mode.

FIG. 1 is a flowchart illustrating a method executable by an MS to control the transmission of dummy blocks in EXT_UTBF_NODATA mode. In a first step 100, the MS receives an indication that EXT_UTBF_NODATA is not enabled. As such, the MS, in a conventional network implementation, would be required to transmit dummy blocks to maintain an allocated TBF resource. In step 102, the MS enters a power saving mode and in step 104, the MS receives a first resource allocation via a USF in accordance with a resource assignment. In step 106, while in the power saving mode and having no blocks (e.g., no RLC/MAC blocks) ready to transmit, the MS operates in an EXT_UTBF_NODATA mode by not transmitting a dummy block to the network. Accordingly, even though the EXT_UTBF_NODATA flag is not enabled, the MS can maintain the resource, even while refraining from transmitting the dummy blocks.

Figure 2:
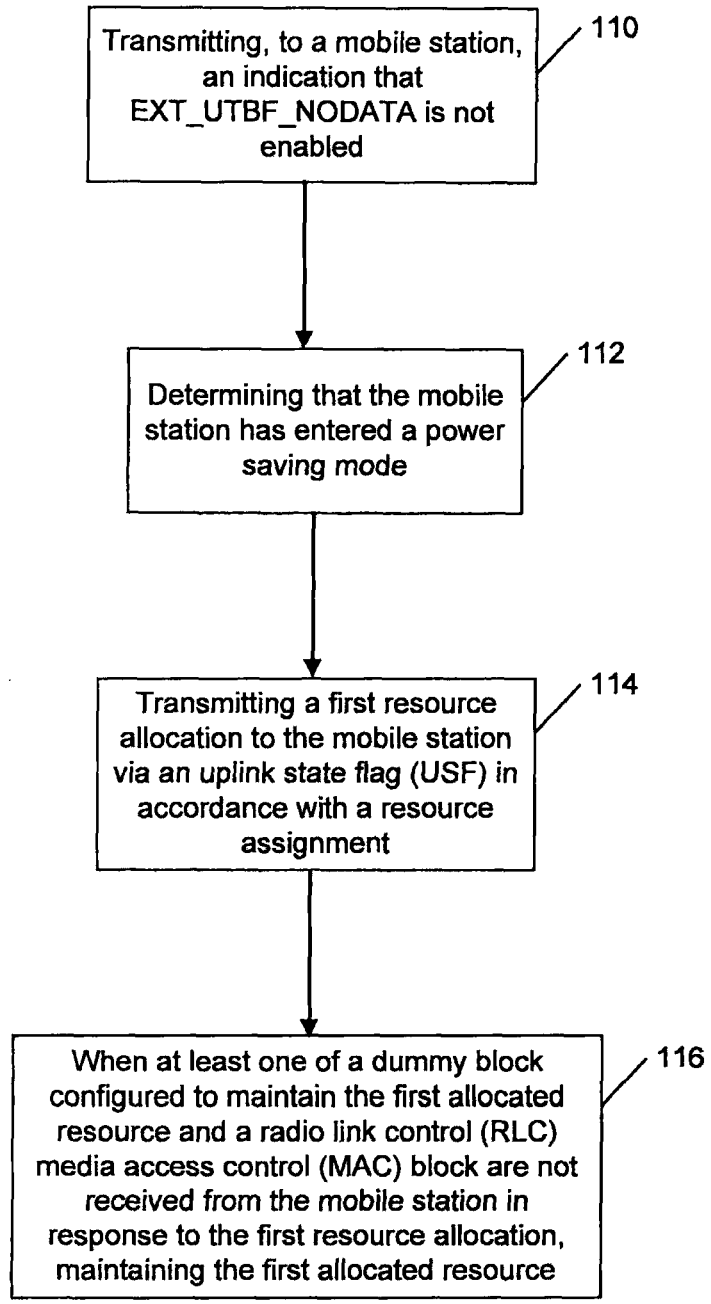
FIG. 2 is a flowchart illustrating a method executable by a network component in accordance with the present disclosure.

FIG. 2 is a flowchart illustrating a method executable by a network component in accordance with the present disclosure. In step 110 the network component transmits, to an MS, an indication that EXT_UTBF_NODATA is not enabled. In step 112, the network component determines that the MS has entered a power saving mode and in step 114 the network component transmits a first resource allocation to the MS via a USF in accordance with a resource assignment. In step 116, when at least one of a dummy block configured to maintain the first allocated resource and an RLC/MAC block in response to the first resource allocation is not received from the MS, the network component maintains the first allocated resource. Accordingly, even though the network component transmitted an indication that EXT_UTBF_NODATA is not enabled (and, so, the MS would ordinarily transmit dummy blocks to maintain the allocated resource when there is not RLC/MAC block ready to send), even when the MS fails to transmit dummy blocks to maintain the allocated resource, the network component is configured to maintain the allocated resource.

Figure 3:
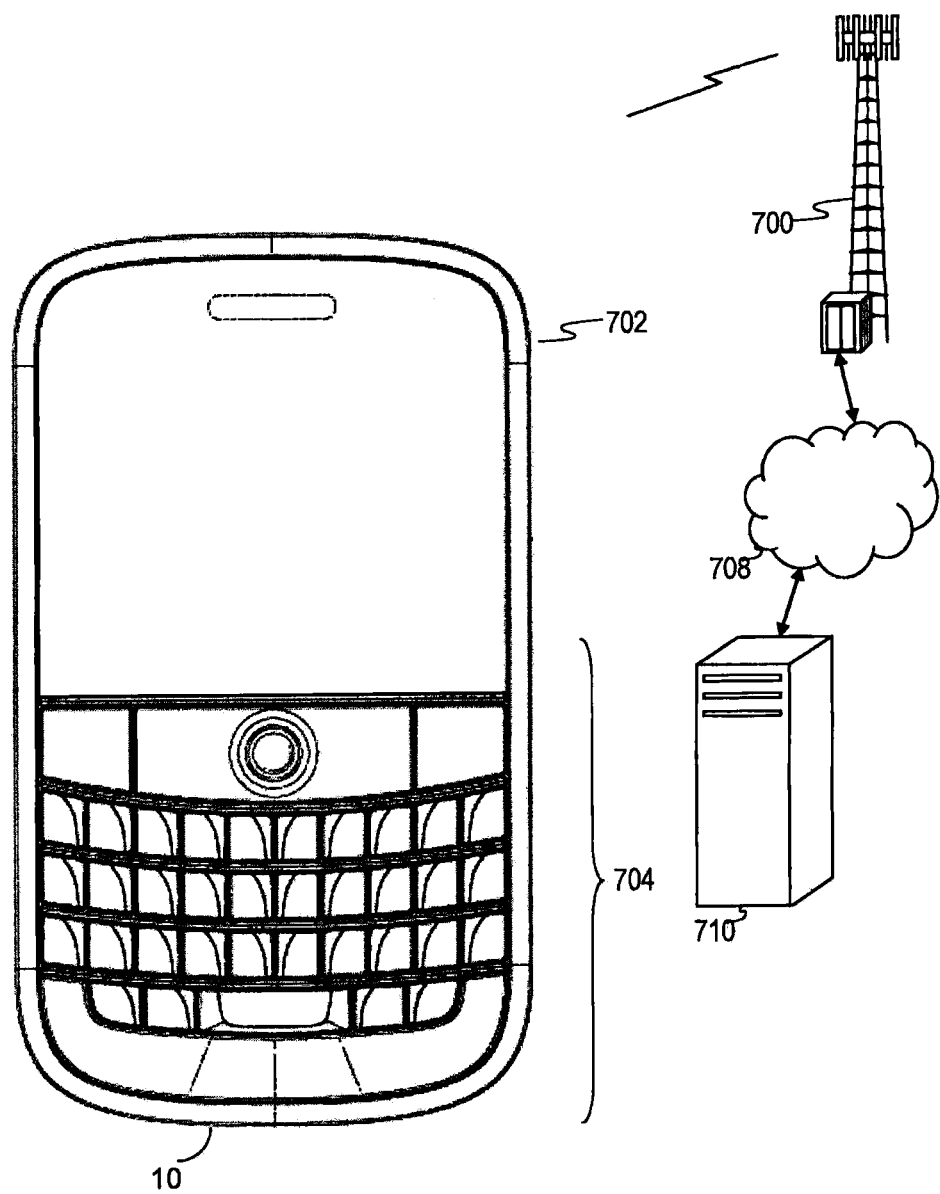
FIG. 3 is a diagram of a wireless communications system including a mobile station operable for some of the various embodiments of the disclosure.

Referring now to FIG. 3, a wireless communications system including an embodiment of an exemplary MS 10 is illustrated. The MS is operable for implementing aspects of the disclosure, but the disclosure should not be limited to these implementations. Though illustrated as a mobile phone, the MS may take various forms including a wireless handset, a pager, a personal digital assistant (PDA), a portable computer, a tablet computer, a laptop computer, smart phones, printers, fax machines, televisions, set top boxes, and other video display devices, home audio equipment and other home entertainment systems, home monitoring and control systems (e.g., home monitoring, alarm systems and climate control systems), and enhanced home appliances such as computerized refrigerators. Many suitable devices combine some or all of these functions. In some embodiments of the disclosure, the MS 10 is not a general purpose computing device like a portable, laptop or tablet computer, but rather is a special-purpose communications device such as a mobile phone, a wireless handset, a pager, a PDA, or a telecommunications device installed in a vehicle. The MS 10 may also be a device, include a device, or be included in a device that has similar capabilities but that is not transportable, such as a desktop computer, a set-top box, or a network node. The MS 10 may support specialized activities such as gaming, inventory control, job control, and/or task management functions, and so on.

The MS 10 includes a display 702. The MS 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a track wheel, an exit or escape key, a trackball, and other navigational or functional keys, which may be inwardly depressed to provide further input function. The MS 10 may present options for the user to select, controls for the user to actuate, and/or cursors or other indicators for the user to direct.

The MS 10 may further accept data entry from the user, including numbers to dial or various parameter values for configuring the operation of the MS 10. The MS 10 may further execute one or more software or firmware applications in response to user commands. These applications may configure the MS 10 to perform various customized functions in response to user interaction. Additionally, the MS 10 may be programmed and/or configured over-the-air, for example from a wireless base station, a wireless access point, or a peer MS 10.

Among the various applications executable by the MS 10 is a web browser, which enables the display 702 to show a web page. The web page may be obtained via wireless communications with a wireless network access node, a cell tower, a peer MS 10, or any other wireless communication network or system 700. The network 700 is coupled to a wired network 708, such as the Internet. Via the wireless link and the wired network, the MS 10 has access to information on various servers, such as a server 710. The server 710 may provide content that may be shown on the display 702. Alternately, the MS 10 may access the network 700 through a peer MS 10 acting as an intermediary, in a relay type or hop type of connection.

Figure 4:
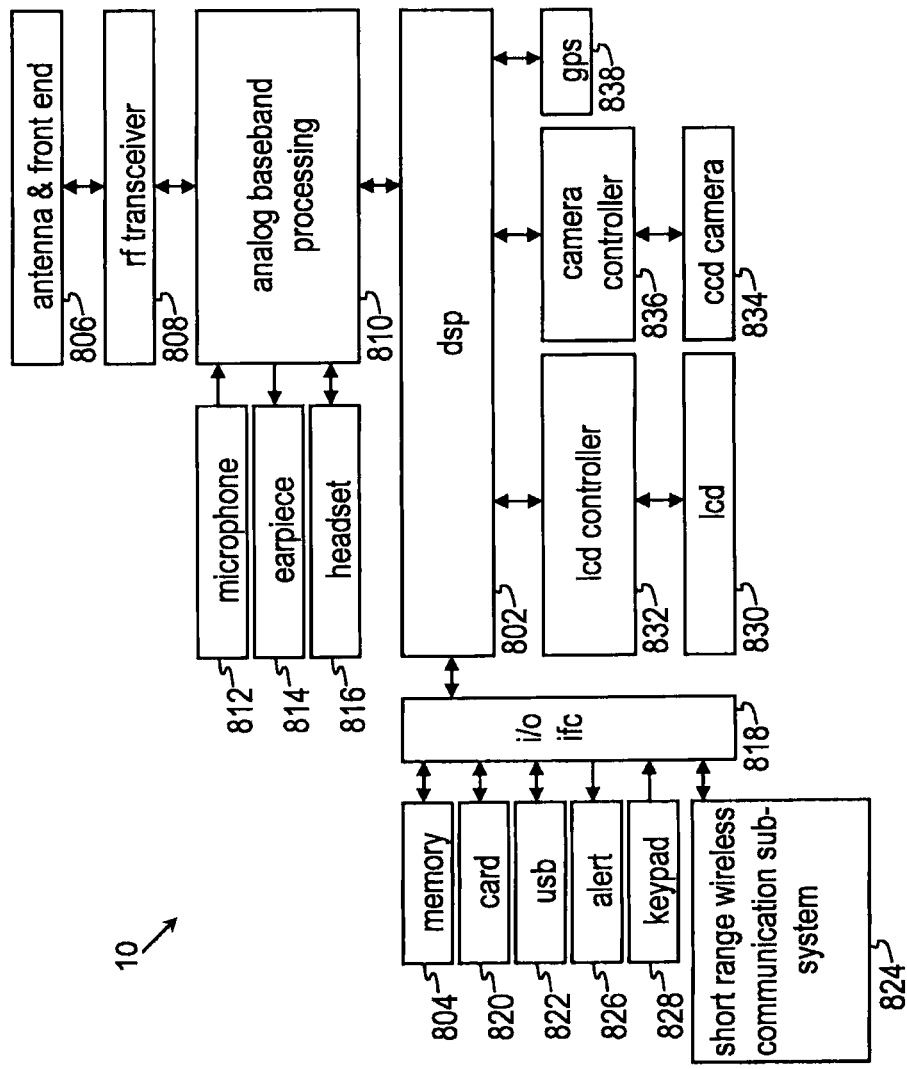
FIG. 4 is a block diagram of a mobile station operable for some of the various embodiments of the disclosure.

FIG. 4 shows a block diagram of the MS 10. While a variety of known components of UAs 10 are depicted, in an embodiment a subset of the listed components and/or additional components not listed may be included in the MS 10. The MS 10 includes a digital signal processor (DSP) 802 and a memory 804. As shown, the MS 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the MS 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the MS 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the MS 10 to send and receive information from a cellular network or some other available wireless communications network or from a peer MS 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF transceiver 808, portions of the antenna and front end 806, and the analog baseband processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the MS 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the MS 10 and may also enable the MS 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the MS 10 to communicate wirelessly with other nearby mobile devices and/or wireless base stations.

The input/output interface 818 may further connect the DSP 802 to the alert 826 that, when triggered, causes the MS 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the MS 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a track wheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the MS 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the MS 10 to determine its position. Various other peripherals may also be included to provide additional functions, e.g., radio and television reception.

Figure 5:
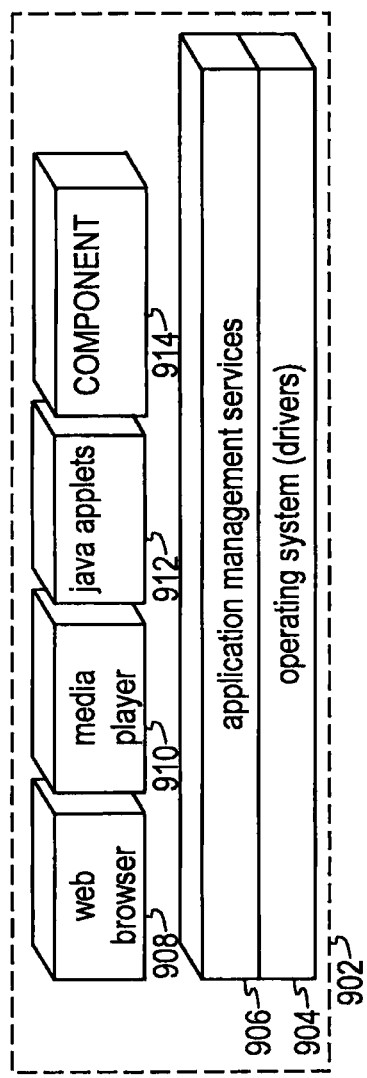
FIG. 5 is a diagram of a software environment that may be implemented on a mobile station operable for some of the various embodiments of the disclosure.

FIG. 5 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services ("AMS") 906 that transfer control between applications running on the MS 10. Also shown in the figure are a web browser application 908, a media player application 910, and Java applets 912. The web browser application 908 configures the MS 10 to operate as a web browser, allowing a user to enter information into forms and select links to retrieve and view web pages. The media player application 910 configures the MS 10 to retrieve and play audio or audio-visual media. The Java applets 912 configure the MS 10 to provide games, utilities, and other functionality. A component 914 might provide functionality described herein.

The MS 10, access device 120, and other components described above might include a processing component that is capable of executing instructions related to the actions described above. FIG. 6 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some embodiments, a program for implementing the determination of a minimum number of HARQ process IDs may be stored in ROM 1040. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the MS 10, such as the display 702 and the input 704.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the scope disclosed herein.

What is claimed is:

1. A method, comprising:
   receiving, at a mobile station, an indication that Extended Uplink Temporary Block Flow NoData (EXT_UTBF_NODATA) is not enabled; and
   without receiving an indication that EXT UTBF NODATA is enabled and with EXT UTBF NODATA not enabled:
   entering a power saving mode,
   receiving a first resource allocation via an uplink state flag (USF) in accordance with a resource assignment, and
   while in the power saving mode and when the mobile station has no radio link control (RLC) media access control (MAC) blocks ready to transmit, operating in an EXT_UTBF_NODATA mode by not transmitting a dummy block to a network.

2. The method of claim 1, including:
   receiving a second resource allocation via a USF in accordance with the resource assignment; and
   using the second allocated resource to transmit an RLC/MAC block.

3. The method of claim 1, wherein receiving the first resource allocation occurs before entering the power saving mode.

4. The method of claim 1, wherein entering the power saving mode includes entering dynamic timeslot reduction (DTR) mode.

5. The method of claim 1, wherein the indication is received using a point-to-point communication protocol.

6. A method, comprising:
   receiving, at a mobile station, an indication that Extended Uplink Temporary Block Flow NoData (EXT_UTBF_NODATA) is enabled; and
   without receiving an indication that EXT UTBF NODATA is not enabled and with EXT UTBF NODATA enabled:
   entering a power saving mode,
   receiving a first resource allocation via an uplink state flag (USF) in accordance with a resource assignment, and
   operating in a non-EXT_UTBF_NODATA mode by transmitting dummy blocks to a network using the first allocated resource.

7. The method of claim 6, including:
   receiving a second resource allocation via a USF in accordance with the resource assignment; and
   using the allocated resource to transmit a radio link control/media access control (RLC/MAC) block.

8. The method of claim 6, wherein receiving the first resource allocation occurs before entering the power saving mode.

9. The method of claim 6, wherein entering the power saving mode includes entering dynamic timeslot reduction (DTR) mode.

10. The method of claim 6, wherein the indication is received using a point-to-point communication protocol.

11. A method, comprising:
    transmitting, to a mobile station, an indication that Extended Uplink Temporary Block Flow NoData (EXT_UTBF_NODATA) is not enabled; and
    without transmitting an indication to the mobile station that EXT UTBF NODATA is enabled:
    determining that the mobile station has entered a power saving mode,
    transmitting a first resource allocation to the mobile station via an uplink state flag (USF) in accordance with a resource assignment, and
    when at least one of a dummy block configured to maintain the first allocated resource and a radio link control (RLC) media access control (MAC) block are not received from the mobile station in response to the first resource allocation, maintaining the first allocated resource.

12. The method of claim 11, including:
    transmitting a second resource allocation to the mobile station via a USF in accordance with the resource assignment; and
    receiving data from the mobile station using the second allocated resource.

13. The method of claim 11, wherein transmitting the first resource allocation occurs before determining that the mobile station has entered a power saving mode.

14. The method of claim 11, wherein determining that the mobile station has entered a power saving mode includes determining that the mobile station has entered dynamic timeslot reduction (DTR) mode.

15. The method of claim 11, wherein the indication is transmitted using a point-to-point communication protocol.

16. A mobile station, comprising:
    a processor in communication with a memory storing instructions executable by the processor, the instructions causing the processor to:
    receive an indication that Extended Uplink Temporary Block Flow NoData (EXT_UTBF_NODATA) is not enabled; and
    without receiving an indication that EXT_UTBF_NODATA is enabled and with EXT_UTBF_NODATA not enabled:
    enter a power saving mode, receive a first resource allocation via an uplink state flag (USF) in accordance with a resource assignment, and while in the power saving mode and when the mobile station has no radio link control (RLC) media access control (MAC) blocks ready to transmit, operate in an EXT_UTBF_NODATA mode.

17. The mobile station of claim 16, wherein operating in an EXT_UTBF_NODATA mode includes not transmitting a dummy block to a network.

18. The mobile station of claim 16, wherein the processor is configured to:

receive a second resource allocation via a USF in accordance with the resource assignment; and use the second allocated resource to transmit an RLC/MAC block.

19. The mobile station of claim 16, wherein receiving the first resource allocation occurs before entering the power saving mode.

20. A network component, comprising:

a processor in communication with a memory storing instructions executable by the processor, the instructions causing the processor to:

transmit, to a mobile station, an indication that Extended Uplink Temporary Block Flow NoData (EXT_UTBF_NODATA) is not enabled;

without transmitting an indication that EXT UTBF NODATA is enabled:

determine that the mobile station has entered a power saving mode, transmit a first resource allocation to the mobile station via an uplink state flag (USF) in accordance with a resource assignment, and when at least one of a dummy block configured to maintain the first allocated resource and a radio link control (RLC) media access control (MAC) block are not received from the mobile station in response to the first resource allocation, maintain the first allocated resource.

21. The network component of claim 20, wherein the processor is configured to: transmit a second resource allocation to the mobile station via a USF in accordance with the resource assignment; and receive data from the mobile station using the second allocated resource.

22. A computer readable storage medium storing program instructions which, when executed by a processor in a mobile station, cause the processor to:

receive an indication that Extended Uplink Temporary Block Flow NoData (EXT_UTBF_NODATA) is not enabled;

enter a power saving mode;

without receiving an indication that EXT_UTBF_NODATA is enabled and with EXT_UTBF_NODATA not enabled:

receive a first resource allocation via an uplink state flag (USF) in accordance with a resource assignment, and while in the power saving mode and when the mobile station has no radio link control (RLC) media access control (MAC) blocks ready to transmit, operate in an EXT_UTBF_NODATA mode.

23. The computer readable storage medium of claim 22, wherein operating in an EXT_UTBF_NODATA mode includes not transmitting a dummy block to a network.

24. The computer readable storage medium of claim 22, wherein the instructions cause the processor to:

receive a second resource allocation via a USF in accordance with the resource assignment; and use the second allocated resource to transmit an RLC/MAC block.

25. The computer readable storage medium of claim 22, wherein receiving the first resource allocation occurs before entering the power saving mode.

\* \* \* \* \*